(12) United States Patent
Parvizi et al.

(10) Patent No.: US 10,678,112 B2
(45) Date of Patent: Jun. 9, 2020

(54) FULLY DIFFERENTIAL TRAVELING WAVE SERIES PUSH-PULL MACH-ZEHNDER MODULATOR

(71) Applicant: Ciena Corporation, Hanover, MD (US)

(72) Inventors: Mahdi Parvizi, Kanata (CA); Naim Ben-Hamida, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/126,061

(22) Filed: Sep. 10, 2018

(65) Prior Publication Data

US 2020/0081314 A1 Mar. 12, 2020

(51) Int. Cl.
*G02F 1/225* (2006.01)
*G02F 1/21* (2006.01)

(52) U.S. Cl.
CPC ...... *G02F 1/2255* (2013.01); *G02F 2001/212* (2013.01)

(58) Field of Classification Search
None
See application file for complete search history.

(56) References Cited

U.S. PATENT DOCUMENTS

| 8,903,202 B1 | 12/2014 | Prosyk et al. | |
| 9,787,466 B2 | 10/2017 | Aouini et al. | |
| 9,841,618 B1 * | 12/2017 | Poulin | G02F 1/2255 |
| 2017/0353333 A1 * | 12/2017 | Dupuis | H04L 25/03076 |
| 2019/0072834 A1 * | 3/2019 | Kono | G02F 1/2257 |

OTHER PUBLICATIONS

Patel et al., Frequency response of dual-drive silicon photonic modulators with coupling between electrodes, vol. 26, No. 7, Apr. 2, 2018, Optics Express 8904, pp. 1-12. (Year: 2018).*
Patel et al., Design, analysis, and transmission system performance of a 41 GHz silicon photonic modulator, May 22, 2015, Optical Society of America, Jun. 1, 2015, vol. 23, No. 1, DOI:10.1364/OE.23.014263, Optics Express 14263, pp. 1-25.
Samani et al., A Low-Voltage 35-GHz Silicon Photonic Modulator-Enabled 112-Gb/s Transmission System, IEEE Photonics Journal, An IEEE Photonics Society Publication, vol. 7, No. 3, Jun. 2015, pp. 1-14.

(Continued)

*Primary Examiner* — Chad H Smith
(74) *Attorney, Agent, or Firm* — Clements Bernard Walker; Christopher L. Bernard; Lawrence A. Baratta, Jr.

(57) ABSTRACT

Disclosed herein are architectures for low power, low voltage traveling wave Mach-Zehnder optical modulators. By combining single-ended series push-pull modulator configurations with differential dual-drive modulator configurations, the advantages of each type may be utilized. In particular, the halved capacitance of single-ended series push-pull modulators may reduce microwave losses, thereby improving bandwidth performance within modulator configurations. Moreover, reduced required drive voltage of dual-drive modulators coupled with increased impedance may advantageously minimize the power consumption and maximize efficiency in the differential traveling wave series push-pull Mach-Zehnder modulator configurations disclosed herein.

12 Claims, 8 Drawing Sheets

(56) References Cited

OTHER PUBLICATIONS

Dong et al., High-speed low-voltage single-drive push-pull silicon Mach-Zehnder modulators, Optical Society of America, published Feb. 29, 2012, Mar. 12, 2012, vol. 20, No. 6, Optics Express 6163, pp. 1-7.

Itu et al., Silicon optical modulator with shield coplanar waveguide electrodes, published Sep. 19, 2014, Optical Society of America, Sep. 22, 2014, vol. 22, No. 19, DOI:10.1364/OE.22.023724, Optics Express 23724, pp. 1-8.

Patel et al., Silicon Photonic Modulators with Coupled Electrodes, May 13, 2018, pp. 1-2.

Bockelman et al., Combined Differential and Common-Mode Scattering Parameters: Theory and Simulation, IEEE Log No. 9412044, IEEE Transactions on Microwave Theory and Techniques, vol. 43, No. 7, Jul. 1995, pp. 1-12.

Ding et al., Design and characterization of a 30-GHz bandwidth low-power silicon traveling-wave modulator, Optics Communications 321 (2014) pp. 124-133.

Ding et al., High-Speed Silicon Modulator With Slow-Wave Electrodes and Fully Independent Differential Drive, IEEE Journal of Lightwave Technology, vol. 32, No. 12, Jun. 15, 2014, pp. 2240-2247.

Patel et al., Frequency response of dual-drive silicon photonic modulators with coupling between electrodes, vol. 26, No. 7, Apr. 2, 2018, Optics Express 8904, pp. 1-12.

Li et al., Analysis of Segmented Traveling-Wave Optical Modulators, IEEE, Journal of Lightwave Technology, vol. 22, No. 7, Jul. 2004, pp. 1789-1796.

Baehr-Jones et al., Ultralow drive voltage silicon traveling-wave modulator, Optical Society of America, May 21, 2012, vol. 20, No. 11, Optics Express, pp. 12014-12020.

* cited by examiner

FULLY DIFFERENTIAL TRAVELING WAVE SERIES PUSH-PULL MACH-ZEHNDER MODULATOR

FIELD OF THE DISCLOSURE

The present disclosure generally relates to electro-optical modulation. More particularly, the present disclosure relates to systems and methods for improving power consumption and bandwidth performance in Mach-Zehnder optical modulators.

BACKGROUND OF THE DISCLOSURE

Electro-optical telecommunications systems and components continue to require improved efficiencies due to rising demands for higher data transmission rates.

In optical communications, optical modulators, such as Mach-Zehnder modulators, may be used to transfer modulated data in electrical (e.g., radio frequency) format onto an optical carrier. Optical Mach-Zehnder interferometer type modulators operate on the principle of interference between two optical waves at a point of recombination near the output port, wherein the optical waves have been divided from a common wave at the modulator's input port. The interference is controlled by a difference between distances traveled by these two optical waves between the points of splitting and recombination. These distances are controlled by varying the optical refractive indices of the two waveguides defining the optical paths or branches between separation and recombination. Of note, it is understood that the distance traveled has a physical distance which is constant and medium induced distance; varying the optical refractive indices varies the medium induced distance.

Capacitance is the primary limiting parameter in carrier depletion modulators which leads to reduced bandwidth and higher power consumption. Thus, strategies to overcome these limitations in optical Mach-Zehnder modulator configurations are needed.

BRIEF SUMMARY OF THE DISCLOSURE

In an embodiment, an optical modulator includes a differential driver connected to at least two transmission line conductors each connected to a respective first electrode and second electrode; an optical waveguide branching into top and bottom regions near an input port and recombining near an output port; a first sub-modulator encompassing the top region and connected to the first electrode; and a second sub-modulator encompassing the bottom region and connected to the second electrode; wherein the first sub-modulator and the second sub-modulator are arranged about a central virtual ground. The first sub-modulator and the second sub-modulator each can operate as a single-ended series push-pull modulator. The first sub-modulator and the second sub-modulator each can operate as the single-ended series push-pull modulator, based on a voltage drop on each diode in the first sub-modulator and the second sub-modulator.

The first sub-modulator can include a first sub-branch of the top region of the optical waveguide that splits and recombines near each distal end of the first sub-modulator, and the second sub-modulator can include a second sub-branch of the bottom region of the optical waveguide that splits and recombines near each distal end of the second sub-modulator. The first sub-modulator and the second sub-modulator can be arranged in a substantially symmetrical layout about the central virtual ground. The first sub-modulator can be driven by a $V_{CM}+V_{RF}$ signal from the differential driver and the second sub-modulator can be driven by a $V_{CM}-V_{RF}$ signal from the differential driver, $V_{CM}$ is a common mode voltage.

In each of the first sub-modulator and the second sub-modulator, first diodes can receive $V_{CM}+V_{RF}$ and second diodes can receive $V_{CM}-V_{RF}$, such that the optical modulator operates as a fully differential series push-pull modulator. The optical modulator can operate as a fully differential series push-pull modulator having approximately half capacitance load relative to a differential push-pull modulator and a differential dual-drive modulator with a same length.

In another embodiment, a method includes providing an optical modulator including a differential driver connected to at least two transmission line conductors each connected to a respective first electrode and second electrode; an optical waveguide branching into top and bottom regions near an input port and recombining near an output port; a first sub-modulator encompassing the top region and connected to the first electrode; and a second sub-modulator encompassing the bottom region and connected to the second electrode; wherein the first sub-modulator and the second sub-modulator are arranged about a central virtual ground.

In a further embodiment, a method of operating an optical modulator includes producing an input signal via a differential driver connected to at least two transmission line conductors each connected to a respective first electrode and second electrode; providing an optical signal to an optical waveguide branching the optical signal into top and bottom regions near an input port and recombining near an output port; modulating a first branch of the optical signal with a first sub-modulator encompassing the top region and connected to the first electrode; and modulating a second branch of the optical signal with a second sub-modulator encompassing the bottom region and connected to the second electrode; wherein the first sub-modulator and the second sub-modulator are arranged about a central virtual ground.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for improved optical modulation. Disclosed herein are configurations for traveling wave series push-pull Mach-Zehnder modulators with differential drivers, in which high bandwidths of operation can be achieved using silicon photonic processes due to reduced required loading capacitance and microwave losses. The modulator configurations may additionally exhibit reduced power consumption, and higher voltage efficiencies in the differential drivers since lowering the capacitance increases the characteristic impedance of the transmission lines. These and other advantages may be achieved by arranging single-ended series push-pull modulators as parallel sub-modulators within a differentially driven traveling wave Mach-Zehnder modulator configuration, as discussed in greater detail below.

The system includes a signal generator with a digital signal processor and a digital-to-analog converter. The signal generator converts a digital signal into a drive signal, such as a radio frequency analog electrical signal. The drive signal is employed to drive the modulator to modulate a narrow-band optical carrier generated by a laser to generate a corresponding optical channel signal, which may then be multiplexed into an optical fiber link for transmission through the optical communications system to a receiver.

In optical communications, optical modulators, such as Mach-Zehnder modulators, can be used to transfer modulated data in electrical (e.g., radio frequency) format onto an optical carrier. Optical Mach-Zehnder interferometer type modulators operate on the principle of interference between two optical waves at a point of recombination near the output port, wherein the optical waves have been divided from a common wave at the modulator's input port. The interference is controlled by the difference between distances traveled by these two optical waves between the points of splitting and recombination. These distances are controlled by varying the optical refractive indices of the two waveguides defining the optical paths or branches between separation and recombination with the understand that the distance is not physically varied.

There are two main methods of phase shifting modulation: single- and dual-branch modulation. In single-branch modulator configurations, a driving voltage that varies between 0 and $-V\pi$ is provided to a first electrode, while a second electrode is held at a constant bias voltage, $V_{bias}$. Under this modulation method, however, the available drive voltage may only cause a phase shift in the optical branch associated with the first electrode, thereby limiting the achievable modulation depth for a given voltage compared with other modulation configurations. The required minimum bias voltage may be equal to the peak-to-peak magnitude of the drive voltage.

In dual-branch or push-pull modulator configurations, the driving voltage is divided between two optical branches. For example, the voltage may vary between 0 and $-V\pi/2$ in one optical branch, and between $-V\pi/2$ and $-V\pi$ in the other optical branch. A third electrode is connected to ground. Modulators operating in a push-pull mode with conventional push-pull drive configurations may use a common voltage or field to phase modulate interfering signals in the two modulator optical branches in anti-phase (or 180° out of phase). In some Mach-Zehnder modulators with three-electrode configurations, first and second electrodes may each be associated with an optical waveguide branch and referred to as traveling wave electrodes. A third electrode may be disposed between the branches.

Typically, in a series push-pull traveling wave electrode Mach-Zehnder modulator, a beamsplitter divides light emitted to an input optical waveguide from a laser into two arms or branches of optical waveguides, wherein one of the branches has a phase modulator for altering the refractive index by varying the strength of a local electric field. In both modulation methods, the two optical beams arrive at a waveguide recombiner in phase when no modulation voltage is applied, resulting in an intensity maximum or an "on" condition. In contrast, whenever a modulation voltage is supplied to one or both optical branches, a differential phase change occurs, resulting in an intensity minimum or "off" condition. Thus, push-pull modulator configurations utilize drive voltages more efficiently than single-branch modulator configurations because a given voltage may cause twice the net phase shift. For example, the optical phase can be advanced on one branch and retarded on the other branch. It is in this sense in which the traveled distances are varied.

The phase modulator for modulating the electric field may be a series push-pull traveling wave electrode arranged adjacent the optical waveguides. A traveling-wave type electrode or traveling wave electrode may be segmented and include pairs of waveguide electrodes and two or more transmission line conductors arranged substantially parallel to the optical branches for applying an input electrical signal that alters the local electric field. Each waveguide electrode may be electrically connected to at least one of the transmission line conductors via a tap or bridge conductor. Each bridge conductor may branch out of the transmission line conductor substantially perpendicular to the optical branch path. The two optical beam branches are recombined with constructive or destructive interference at an output with an amplitude or intensity that depends on the local electric field applied. Proximity of electrodes to waveguides allows the electrical field to change the material index of refraction in waveguide which is physical property of the waveguide material.

In series push-pull modulator configurations, the two transmission line conductors are coupled and act as a current-return path for each other. In some conventional series push-pull modulator configurations, each pair of waveguide electrodes that impart a phase change to the optical wave in the optical waveguide may also act as a pair of capacitors in series and as a load on the main transmission line. Within a pair of waveguide electrodes, lateral radio frequency current may flow between two signal branches through a common conducting backplane above an insulating substrate. A traveling wave electrode may match the characteristic impedance of the separated electrode pairs. When a voltage difference is applied between the two waveguide electrodes, current may flow from a highly p-doped contact material beneath the waveguide electrode through a p-i-n junction or PIN structured diode and a common conducting n-backplane, and up through the opposite p-i-n junction and signal transmission line conductor. The p-i-n semiconductor layers may act as capacitors connected in series through the common conducting n-backplane. This type of back-to-back p-n junction series connection may advantageously halve the required loading capacitance on the transmission lines compared to configurations with electrically-independent modulator branches. This can result in bandwidth performance advantages. Alternatively, an independent traveling wave electrode may be used for each of the two optical branches of a modulator. The two optical branches of a differential-drive modulator may be electrically independent and independently driven with two electrical radio frequency drive voltages required. There may be no common conducting backplane under the optical waveguides to place the electrode capacitance in series, so it may not have the advantage of half-capacitance derived from the series push-pull modulator configurations.

Driver's side, driving, or push differential modulators advantageously only include half the capacitance of series modulator configurations. Reducing the capacitance results in a greater loading impedance, since the driver's side of the differential modulator sees the load impedance as V/R. However, the lower capacitance differential modulator configurations' bandwidth is correspondingly limited as compared with series modulator configurations.

Single-drive Mach-Zehnder modulator configurations use single-ended drivers and one unshielded signal transmission line. The unshielded signal transmission line of series push-pull Mach-Zehnder modulator configurations with coplanar strips or strip lines may result in more electromagnetic interference. However, the lowered capacitance at the equivalent p-n junction in these series push-pull Mach-Zehnder modulators may correspondingly reduce the electromagnetic interference, thereby improving the bandwidth while only requiring a single driver at one end.

Optical modulator configurations may be based on the carrier depletion of silicon p-n junctions or diodes with capacitively loaded traveling wave electrodes. The p-n junctions (PNJ) of the modulator may be divided into segments that connect to the traveling wave electrodes for receiving a modulation voltage from the input driver circuit. The traveling wave electrodes may propagate the input data as a radio frequency traveling wave to multiple PNJSs along the length of the modulator branches. A symmetric coplanar stripline bus electrode may enclose both modulator optical branches, and segments of the modulator may be periodically loaded to the bus electrode using narrow T-rails, for example. Passive optical waveguides may lie between the modulator segments. The radio frequency traveling wave may be propagated along the length of the modulator optical branches in a push-pull mode, in which the phase changes of the optical signal in both optical branches of the modulator are in opposite directions. With a single input drive signal, each optical branch may be driven with half of the bus voltage in push-pull mode. This push-pull operation can significantly reduce modulation-induced frequency chirp in the optical signal output of the modulator. Although drive voltage is not reduced when compared to conventional single-branch modulator configurations, the capacitance loading (Cload) from the modulator to the radio frequency signal transmission line may be only half of the diode capacitance since the two diodes are connected in series. This can improve modulator bandwidth. The impedance and effective refractive index of the loaded radio frequency signal transmission line may be adjusted by the amount of capacitance loading or a filling factor of the active modulation segments. In series push-pull modulator configurations, a single input driver circuit can be used to drive input data (e.g., time-varying modulation voltage) to both modulator branches connected by PN junctions.

Some traveling wave modulator configurations include two transmission line conductors—one carrying the input electrical signal (S) and the other connecting to a reference or ground potential (G)—and are therefore known as SG configurations. These SG configurations may be driven by a single-ended driver, such as a radio frequency driver. One output of the radio frequency driver with an output impedance may be connected to the signal transmission line conductor. The other output of the radio frequency driver may be grounded and connected to the ground transmission line conductor of the optical modulator. A nominal terminal load may connect the distal ends of a traveling wave electrode. The modulation voltage across the signal and ground transmission line conductors of the traveling wave electrode may be represented by the signal voltage minus the ground voltage. A large fraction of the electrical power supplied by the radio frequency driver may be lost. Because alternating voltages and currents are present in both of the transmission line conductors, they may couple strongly to any neighboring modulators in close proximity, thereby causing crosstalk. Alternatively, an incoming electrical waveguide may include a single (nondifferential) signal transmission line conductor (S) with two ground transmission line conductors (G), one of which may be openterminated without contact to the Mach-Zehnder modulator, thereby causing poor modulation performance. Generally, coplanar strips or striplines are used in differential (balanced) transmission line, and coplanar waveguides are used for unbalance transmission lines. However, in series pushpull modulator configurations, the coplanar strips are unbalanced because the modulators are single-ended, such as in SG or GS architectures (S=Signal, G=Ground).

Other Mach-Zehnder modulator configurations may include five transmission line conductors, arranged in a GSGSG order. These GSGSG configurations may include two independent signal transmission line conductors, each with an adjacent ground transmission line conductor, as well as a single central ground transmission line conductor between the two signal transmission line conductors. The signal transmission line conductors may be electrically independent with different current-return paths. Nominal termination loads may connect the ends of the first signal transmission line conductor with the first and central ground transmission line conductors and the ends of the second signal transmission line conductor with the central and third ground transmission line conductors. This GSGSG configuration may be driven in a differential drive mode, where both outputs RF+ and RF− of a radio frequency driver are connected through two optical waveguides to traveling wave electrodes and have a characteristic output impedance. The ground conductors may be connected to the first, second, and central ground transmission line conductors. Nominal termination loads may be connected across the ends of the traveling wave electrodes. The RF+ and RF− outputs from the radio frequency driver may be in anti-phase (or 180° out of phase). The modulation voltage is then RF+ minus RF−, or 2RF. Since both radio frequency driver outputs are utilized power efficiency is greatly improved compared to the single-ended drive configuration.

Figure 1:
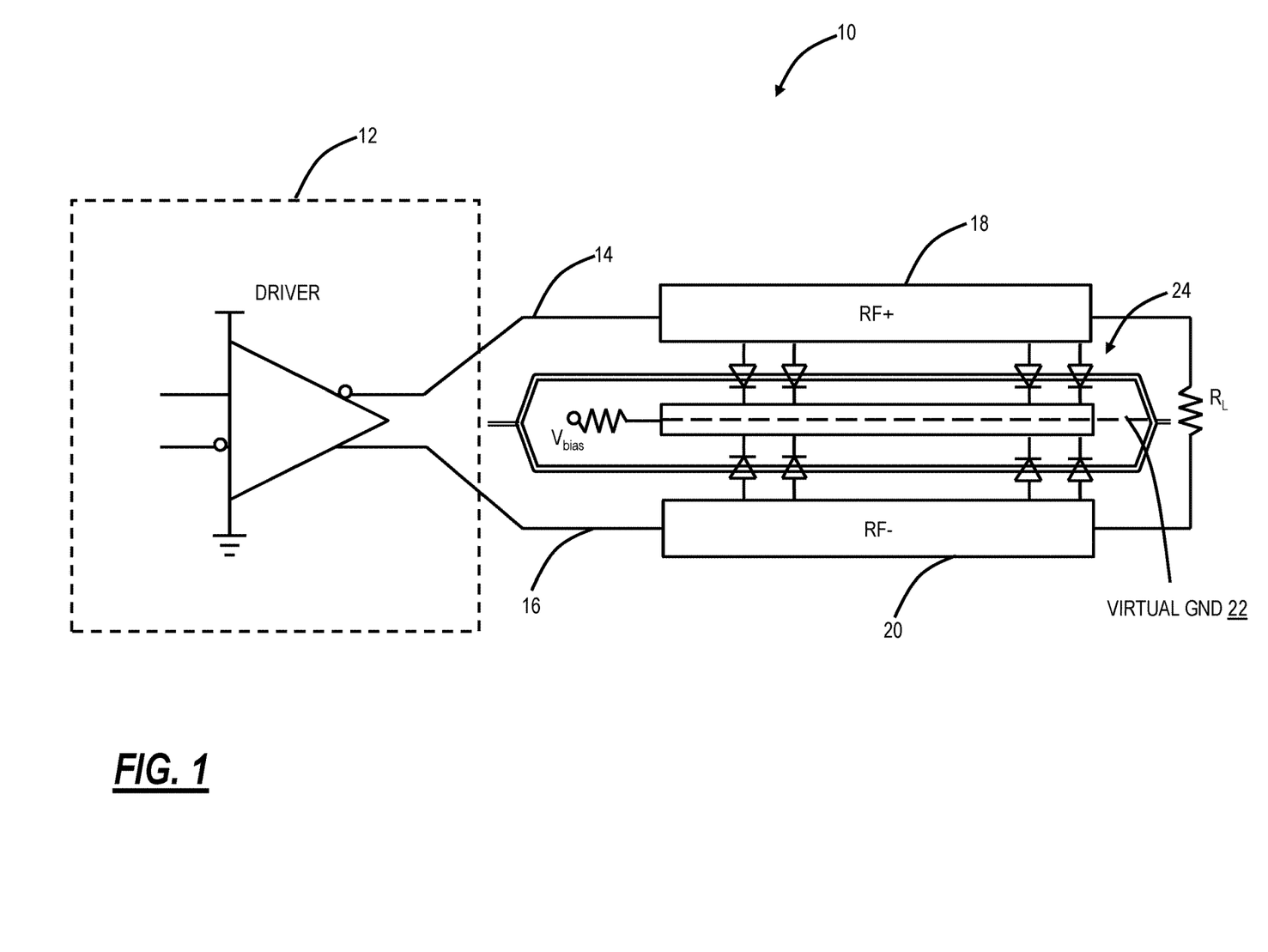
FIG. 1 is a schematic diagram of a single-ended series push-pull Mach-Zehnder modulator, driven by a driver with a differential output.

FIG. 1 shows a single-ended series push-pull optical modulator 10, driven by a differential driver 12 with a differential output 14, 16. The differential driver 12 may be a radio frequency (RF) driver with outputs of RF+ and RF− or both a $+V_{RF}$ and a $-V_{RF}$ signal. Analog radio frequency signals may include alternating current flows oscillating in a range from about 20 kHz to about 300 GHz. Microwaves of radio frequency signals may range from about 1 GHz to about 30 GHz.

For operation at high frequency (e.g., 10 GHz or more), the differential output 14, 16 may be connected to radio frequency traveling wave electrodes 18, 20 acting as radio frequency transmission lines. The traveling wave electrodes 18, 20 may be elongated electrodes connected to p-n junctions for transmitting a modulation voltage to alter the local electric field. The capacitance of the p-n junctions may add to the capacitance of the elongated electrodes 18, 20. This capacitance loading may cause characteristic impedance matching with respect to the input driver circuit and/or group velocity matching with respect to the optical waves propagating in the optical waveguides (not illustrated).

Optical communications technologies utilize Mach-Zehnder modulators for wideband modulation in optical domain using electrical data. Mach-Zehnder modulators may be configured in many different architectures. Conventional architectures include (1) push-pull, (2) series push-pull, and (3) parallel push-pull configurations. These push-pull architectures advantageously utilize drive voltages more efficiently than single-branch modulator configurations, as described above.

Traditionally, to drive these diode configurations 24, a single-ended coplanar (ground-signal) transmission line is used. Conventional differential drivers may also be used to drive the modulator differentially as shown in FIGS. 1-2.

As shown in FIG. 1, optical modulation may be implemented based on a Mach-Zehnder modulator configuration that is driven differentially. The driving signal may be a differential signal provided on the transmission lines generated with a differential pair of drivers. Traveling wave electrodes 18, 20 may each receive the active electrically modulated signal from the respective line 14, 16 at ends near the input port. A matching impedance may connect the second end of the electrode near the output port of the modulator to the ground, while the matching impedance connects the second end of the other electrode to ground. This results in the impedance of each traveling wave electrode being substantially twice the impedance to ground of the individual active transmission lines, creating a virtual ground line 22. This virtual ground line 22 is not electrically connected to a physical ground but is located somewhere between the traveling wave electrodes 14, 16, substantially parallel to the direction of propagation of the drive radio frequency wave. This drive configuration may reduce the drive amplitude required of individual drive circuits to approximately half that required for push-pull drive configurations. In other words, differential drive modulator configurations that utilize a virtual ground may reduce the peak-to-peak drive voltage by a factor of two. Thus, modulation may include connecting the impedances to the recombiner sides of traveling wave electrodes and to ground, applying drive signals to the splitter sides of the traveling wave electrodes 14, 16, and adjusting the value of the impedances to obtain the virtual ground 22.

Figure 2:
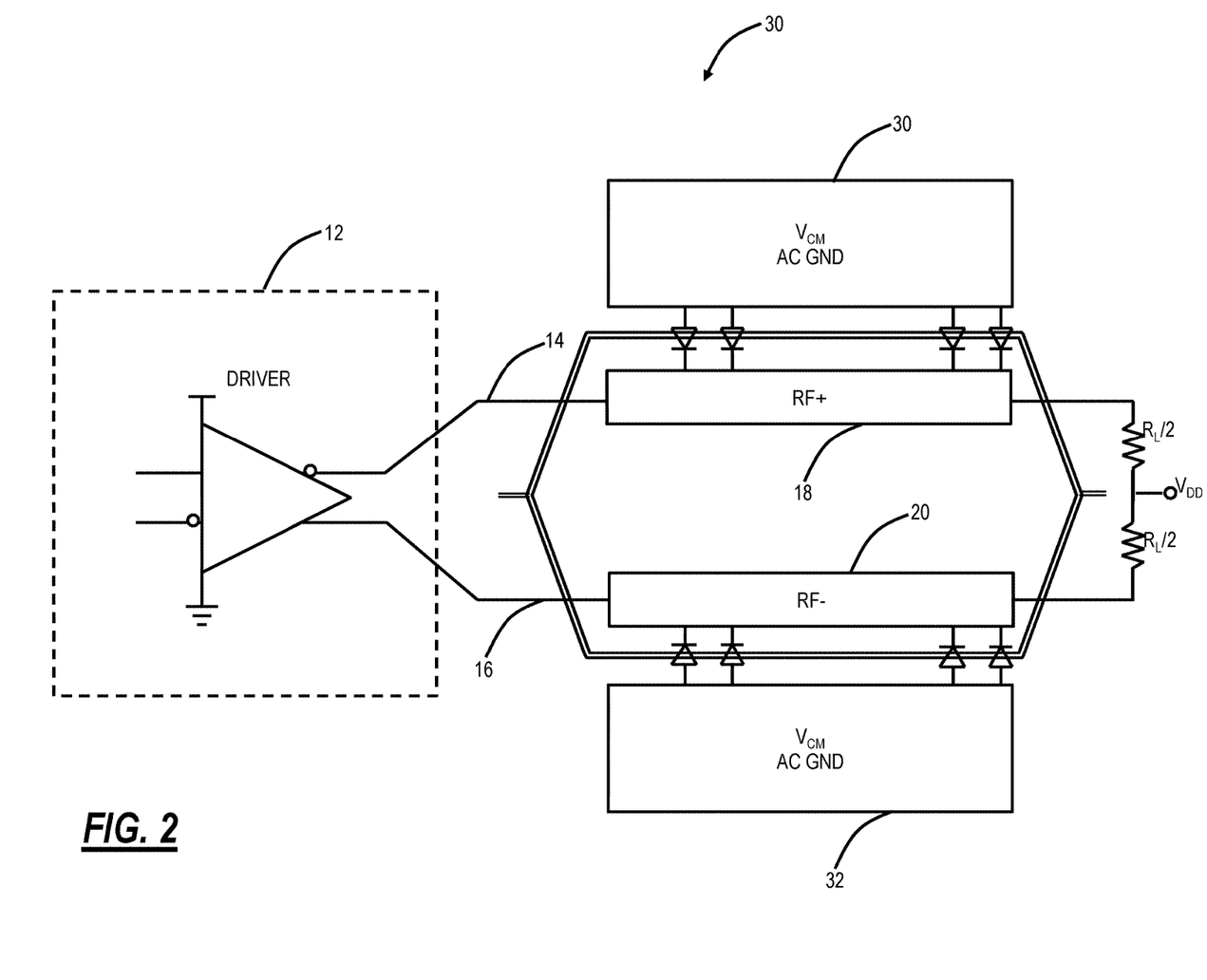
FIG. 2 is a schematic diagram of a dual-drive parallel push-pull Mach-Zehnder modulator with a differential coplanar transmission line.
Figure 3:
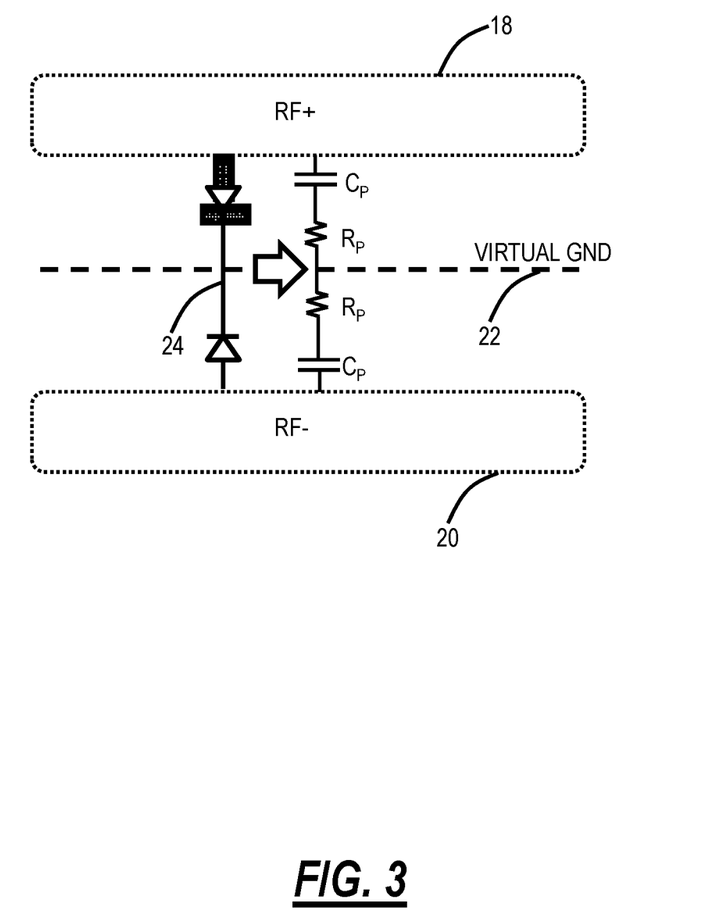
FIG. 3 is a signal representation diagram of the differentially driven series push-pull modulator of FIG. 1.

The differential modulators in FIGS. 1-2 have similar electro-optic responses since the radio frequency signal transmission lines see a single capacitance of the diode to ground. As shown in FIG. 3, the parasitics of each phase shifting diode 24 of the modulator configuration of FIG. 1 may be modeled by Rp and Cp.

As described above with respect to conventional series push-pull modulators, the p-n junction may be back-to-back, resulting in a doubled equivalent p-n junction resistance ($R_{mod}=2R_{pn}$) and a halved capacitance ($C_{mod}=C_{pn}/2$). This does not occur in dual-drive modulators. In dual-drive modulators, even if two p-n junctions are placed in series between two signal electrodes, the effective resistance and capacitance is the same as a single p-n junction, since a differentially driven modulator's negative electrode has the same magnitude and opposite polarity of its positive electrode, and the central virtual ground causes the equivalent junction resistance ($R_{mod}=R_{pn}$) and capacitance ($C_{mod}=C_{pn}$) seen by the unloaded transmission line to be the same as a single p-n junction. Here, $R_{pn}$ and $C_{pn}$ are in lumped units and represents the portion of a segment that is loaded by the p-n junction (lloaded).

Therefore, unlike series push-pull modulator configurations, there is no capacitance reduction for a differentially driven modulator 10 differentially driven. This is described in David Patel, Mandi Parvizi, Naim Ben-Hamida, David Plant, "Frequency response of dual-drive silicon photonic modulators with coupling between electrodes," Optics Express 26.7 (2018): 8904-8915, the contents of which are incorporated by reference herein.

FIG. 2 shows a dual-drive parallel push-pull optical modulator 30 with a differential (coplanar) transmission line. Dual-drive Mach-Zehnder modulator configurations use differential drivers and two signal transmission lines 14, 16. Both radio frequency signal transmission lines in the differential dual-drive modulator see a single $R_p$ and $C_p$ to ground. Differential dual-drive modulator configurations distribute the drive voltage over two electrodes 18, 20. Dual-drive modulator configurations may be characterized by four ports—two input ports and two output ports. Differential mode renders the modulator configuration less susceptible to crosstalk and/or other electromagnetic interference, as discussed above. Dual-drive modulator configurations approximately halve the drive voltage compared to a single-drive modulator, because one optical branch may have a +π/2 phase shift while the other has a −π/2 phase shift. Despite requiring two drive voltages 30, 32, reducing the drive voltage by a factor of 2 similarly reduces the dynamic power consumption by half in dual-drive modulator configurations.

Dual-drive modulators may be arranged in GSSG configurations (Ground-Signal-Signal-Ground), as shown in FIG. 2, where outer grounds help shield inter-device crosstalk. Intra-device crosstalk may be eliminated by utilizing differentially driven signaling, which may also reduce other electromagnetic interference.

As long as differential mode characteristics are inputs, symmetric along length for negligible differential-to-common and common-to-differential mode conversion, and virtual ground can be assumed, Loading and source and termination resistances may be split into equivalent halves for modeling as long as inputs are symmetric along length for negligible differential-to-common and common-to-differential mode conversion, and virtual ground can be assumed. Differentially driven dual-drive modulators may not have the same bandwidth benefit of series push-pull modulators. With dual-drive modulators, even if two p-n junctions are placed in series between the two signal electrodes, the effective resistance and capacitance is that of a single p-n junction. This happens because the Mach-Zehnder modulator is driven differentially (odd mode), which means the negative electrode has the same magnitude but opposite polarity to that of the positive electrode.

Dual-drive Mach-Zehnder modulators equipped with a differential driver using two signal transmission lines may provide improved distribution for the higher drive voltages in these large-bandwidth/small-length carrier depletion devices.

As shown in FIG. 2, a differential dual-drive push-pull modulator 30 may be characterized as having four ports— two input ports and two output ports. As shown in FIG. 1, there may be a virtual ground 22 at the axis of symmetry along the length of the modulator 10. This symmetry results in a single diode capacitance loading for each side of the differential transmission line. Additionally, both transmission lines may have an identical electro-optical response such that the differential-to-common and common-to-differential mode conversion will be negligible. So, the parameters $S_{D1C1}$, $S_{D1C2}$, $S_{D2C1}$, $S_{D2C2}$, $S_{C1D1}$, $S_{C1D2}$, $S_{C2D1}$, and $S_{C2D2}$ in the mixed-mode matrix may be ignored. Further, since a dual-drive modulator will be operated with a differential driver 12, the common mode response parameters $S_{C1C1}$, $S_{C1C2}$, $S_{C2C7}$, and $S_{C2C2}$ May be ignored. Thus, the transmission line may be represented by the parameters $S_{D1D1}$, $S_{D1D2}$, $S_{D2D1}$, and $S_{D2D2}$.

Multiple input and output ports on a modulator may have the same signal (i.e., common mode) or a signal with the same magnitude but in anti-phase (i.e., differential mode), and thus may be combined into single input and output ports. Differential signals in a modulator may be represented as a combination of common mode and differential mode signals at the input and output ports. For a linear four-port single-ended modulator, the electro-optical response may be modeled by the following mixed-mode matrix:

$$[S_{mm}] = \begin{bmatrix} S_{D1D1} & S_{D1D2} & S_{D1C1} & S_{D1C2} \\ S_{D2D1} & S_{D2D2} & S_{D2C1} & S_{D2C2} \\ S_{C1D1} & S_{C1D2} & S_{C1C1} & S_{C1C2} \\ S_{C2D1} & S_{C2D2} & S_{C2C1} & S_{C2C2} \end{bmatrix}$$

Because differentially driven modulators 10, 30 advantageously have no intra-device crosstalk, the signal that crosses over to the other port (i.e., the voltage difference at the terminal) is part of the forward response and has opposite polarity. In a single-ended modulator 10 the differential forward response and reflection yield identical values for the parameters $S_{D1D1}$, $S_{D1D2}$, $S_{D2D1}$, and $S_{D2D2}$.

Figure 4:
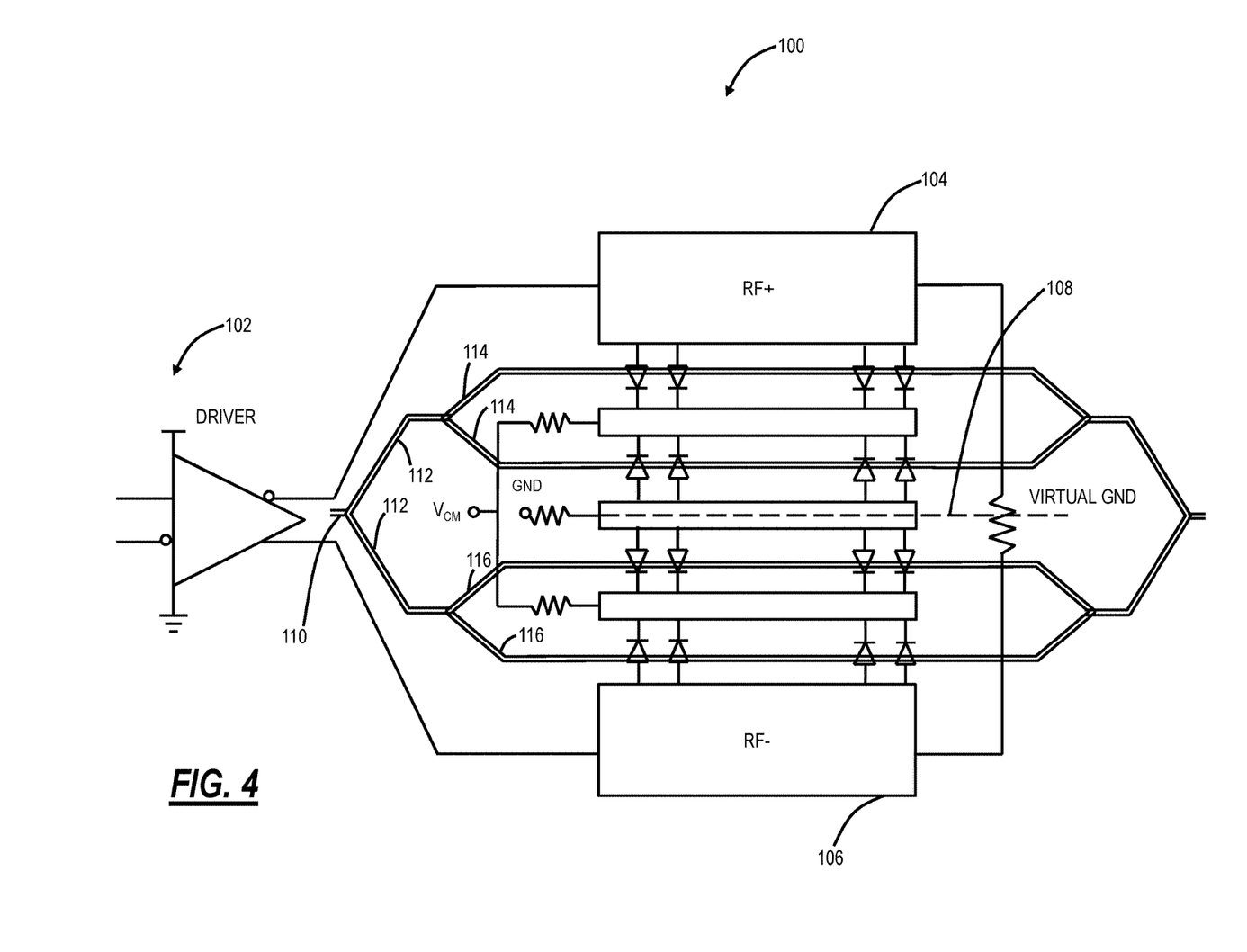
FIG. 4 is a schematic diagram of a differential traveling wave series push-pull Mach-Zehnder modulator, in accordance with the present disclosure.

FIG. 4 shows a proposed differential series push-pull modulator 100, which takes advantage of both differentially driven signaling and a half capacitance Cp/2 seen by radio frequency signal transmission lines as in single-ended series push-pull modulator 10 configurations, as described above. FIG. 4 highlights the proposed modulator configuration architecture, including a differential driver 102, outputting radio frequency signals to electrodes 104, 106 (RF+, RF−), and a virtual ground 108 located centrally along the line of symmetry extending across the length of the modulator 100 configuration. The operating principles of this modulator are shown in FIG. 5A.

Figure 5A:
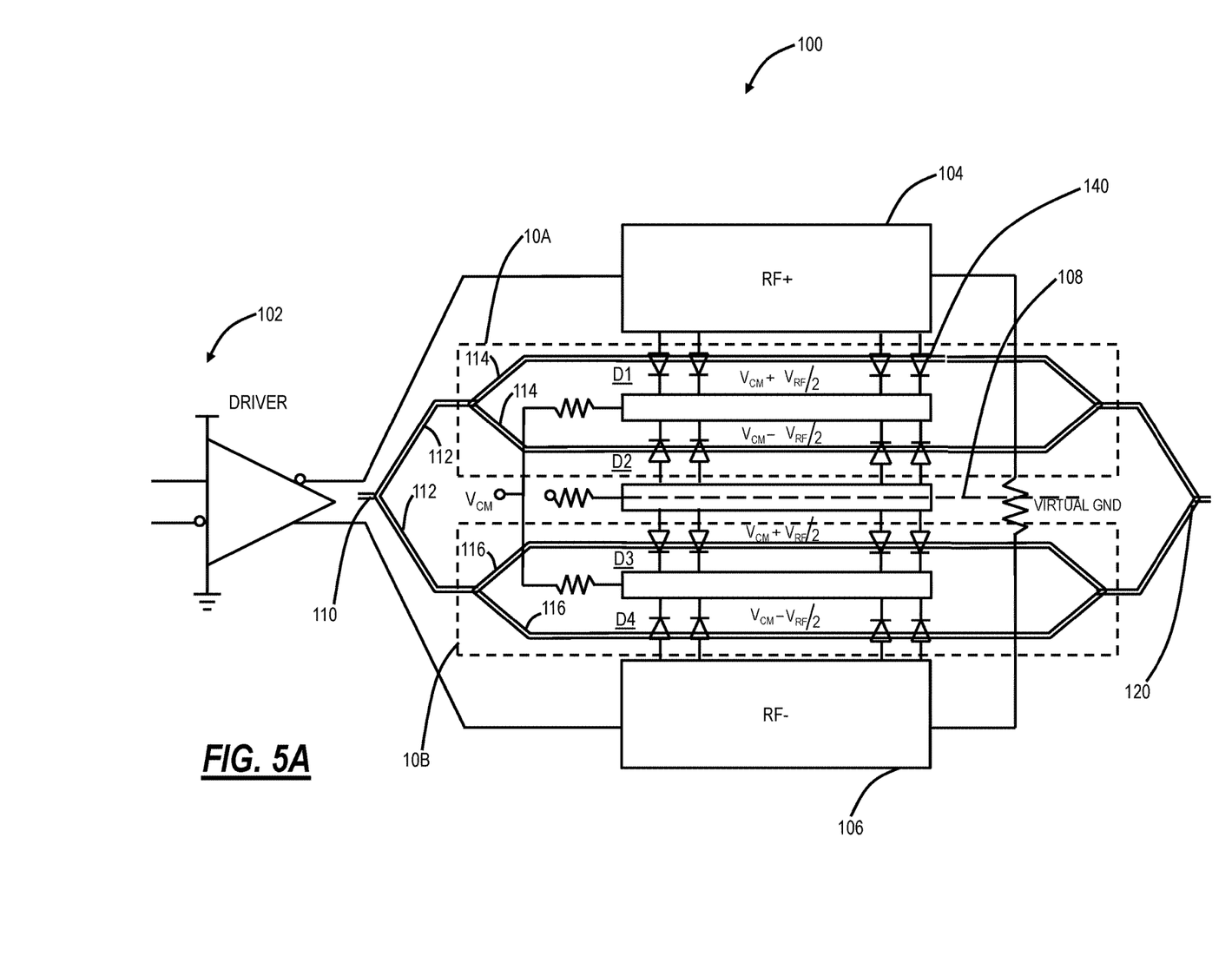
FIG. 5A is a schematic diagram of a differential traveling wave series push-pull Mach-Zehnder modulator illustrating the operating principles, in accordance with the present disclosure.
Figure 5B:
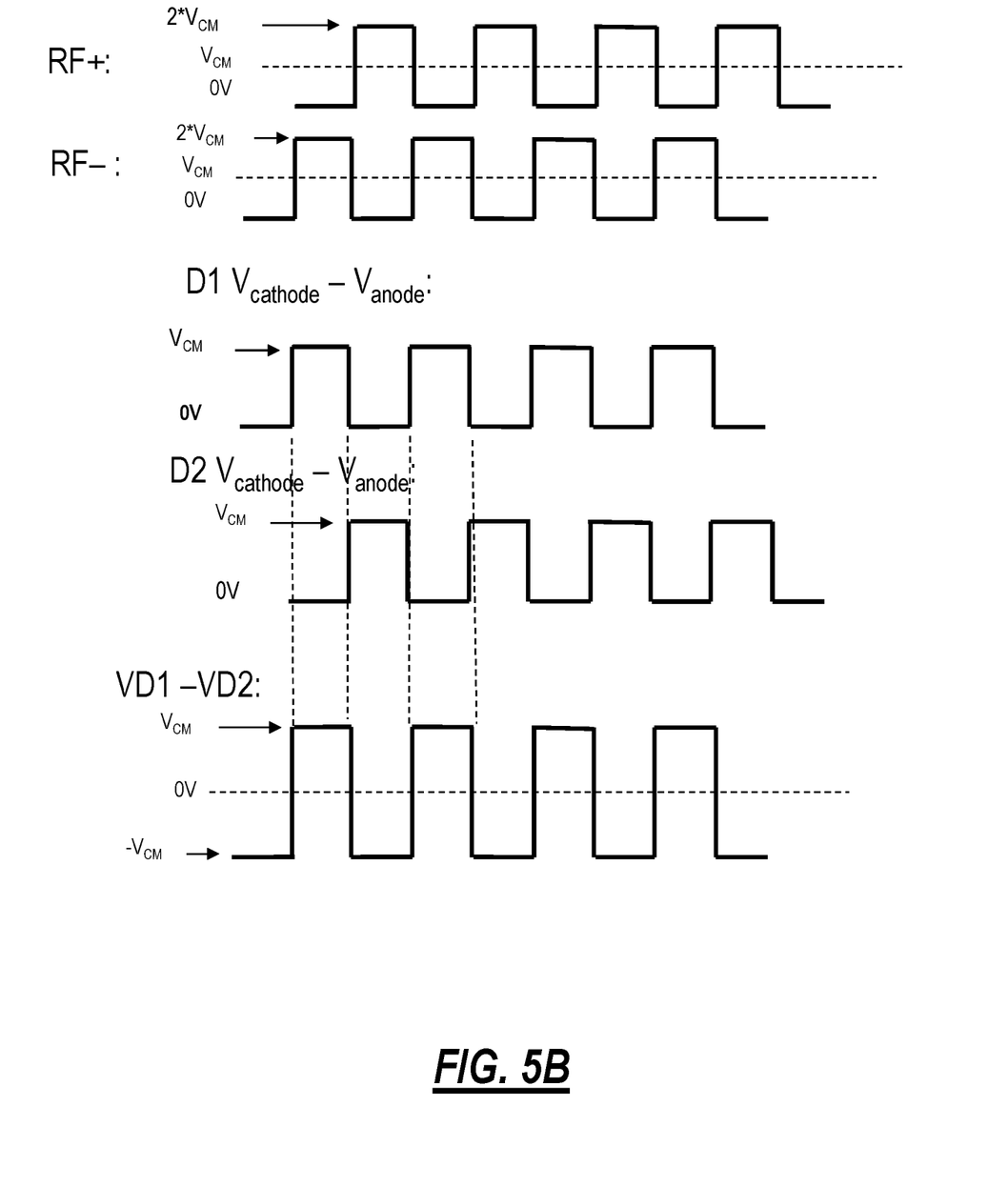
FIG. 5B is graphs of various transient waveforms associated with the differential traveling wave series push-pull Mach-Zehnder modulator of FIG. 5A, in accordance with the present disclosure.

As shown in FIGS. 4-5, the input light 110 may be split between two single-ended series push-pull sub-modulators 10A, 10B, as discussed above and shown in FIG. 1. The top sub-modulator 10A may be driven by a $+V_{RF}$ signal, and the bottom sub-modulator 10B may be driven by $-V_{RF}$.

Specifically, the differential series push-pull modulator 100 includes two optical waveguides 112 which split the input light 110 to the two single-ended series push-pull sub-modulators 10A, 10B. Each of the single-ended series push-pull sub-modulators 10A, 10B include optical waveguide pairs 114, 116, respectively. Each optical waveguide 112 branches into the optical waveguide pairs 114, 116 which are in the respective sub-modulators 10A, 10B. The optical waveguide pairs 114, 116 enable an optical signal to pass through the respective sub-modulators 10A, 10B and each of the optical waveguide pairs 114, 116 recombine at outputs of the respective sub-modulators 10A, 10B. The recombined outputs of the sub-modulators 10A, 10B recombine at an output 120 of the differential series push-pull modulator 100.

The single-ended series push-pull sub-modulator 10A encompasses a top region and includes a first sub-branch of the top region of the optical waveguide 112 that split (114) and recombines near each distal end of the first sub-modulator 10A. The single-ended series push-pull sub-modulator 10B encompasses the bottom region and includes a second sub-branch of the bottom region of the optical waveguide 112 that splits 116 and recombines near each distal end of the second sub-modulator 10B. The first and second sub-modulators 10A, 10B are arranged substantially symmetrically about a central virtual ground 108 and the sub-modulators 10A, 10B are each arranged as single-ended series push-pull modulators.

FIG. 5A also illustrates how the voltage drops across the diodes 140, thereby causing the sub-modulators 10A, 10B to operate like single-ended series push-pull modulators. The first diode D1 on the top sub-modulator 10A receives the common mode Voltage ($V_{CM}$)+an RF Voltage ($V_{RF}$) and the second diode D2 receives $V_{CM}-V_{RF}$, which is the differential mode with respect to the first diode. $V_{CM}$ is a common-mode voltage which is a DC voltage applied through a high impedance path to set the DC voltage of the diodes D1, D2, and to make sure that the diodes Dlm D2 are reverse biased. The $V_{CM}$ sets the DC operating point of the diodes D1, D2. Similarly, the first diode D3 from the top for the bottom sub-modulator 10B receives $V_{CM}+V_{RF}$ and the second diode D4 on the bottom receives $V_{CM}-V_{RF}$. These voltage drops cause the whole modulator configuration to operate as a fully differential series push-pull modulator.

As the electrodes 104, 106 (RF+, RF−), vary during a cycle, the resistors (or inductors) on the left side of these potentials are needed to create a high impedance path to the modulator so that $V_{CM}$ only sets the DC point of each diode D1, D2, D3, D4 and does not load the RF signals. This is common to any traveling wave modulator, except that here there is a need to provide $V_{CM}$ to two different nodes. The transient operation of the modulator is described further in the graphs of FIG. 5B. $V_{CM}$ determines the reverse biased voltage of the diodes D1, D2, D3, D4, similar to any modulator as the diodes are more reversed biased the parasitic capacitor decreases which leads to higher bandwidth in the modulator.

The output powers of the modulator configuration of FIGS. 4-5 may be expressed as:

$$Pout_{sub1} = \frac{Pin}{2}(1+\cos\Delta\varphi)$$

$$Pout_{sub2} = \frac{Pin}{2}(1+\cos(-\Delta\varphi))$$

Since $\cos(-\Delta\varphi)=\cos\Delta\varphi$, $Ptotal=Pout_{sub1}+Pout_{sub2}=Pin(1+\cos\Delta\varphi)$ These expressions indicate that the output power of the modulator configurations of FIGS. 4-5 is like that of a conventional modulator configuration with a phase shift of $\Delta\varphi$.

Figure 6:
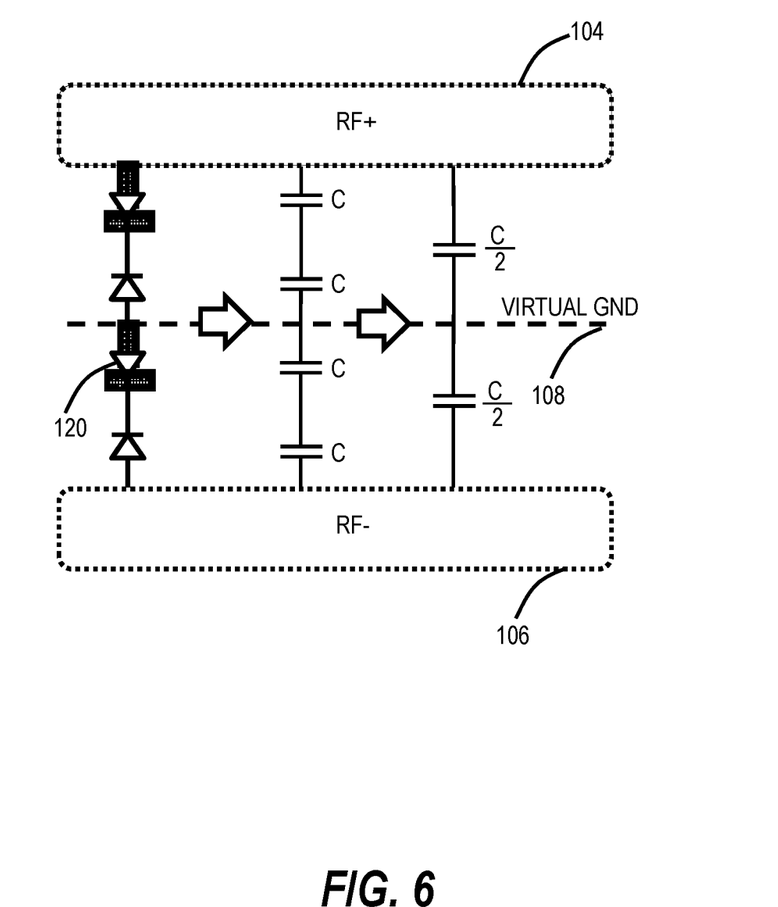
FIG. 6 is a signal representation diagram of the differential traveling wave series push-pull Mach-Zehnder modulators of FIGS. 4-5, in accordance with the present disclosure.

The load of the transmission line in the modulator configurations of FIGS. 4-5 may be represented by the schematic shown in FIG. 6. As shown, in a similar manner to single-ended series push-pull modulators, the capacitance seen by each radio frequency signal transmission line may be halved, while the resistance (not shown) is doubled. In other words, FIG. 6 illustrates that the capacitance of the diodes 140 seen by each differential radio frequency signal transmission line in the modulator configurations of FIGS. 4-5 is half of that of a single diode.

This lowered capacitance may result in significant improvements in bandwidth as compared to conventional differential push-pull modulator configurations. However, the phase shift trade-off remains as in the single-ended series push-pull modulator configurations, and thus, the phase shift provided may be half compared to that of parallel push-pull modulator configurations.

Table A below summarizes and compares the characteristics of the differential series push-pull modulator configurations of FIGS. 4-5 with the differential push-pull and dual-drive modulators of FIGS. 1-2, respectively. The compared characteristics include the effective or equivalent capacitive loads in both differential and common modes, the characteristic impedance in the differential transmission line, and the optical insertion loss for a given phase shift and driving voltage. The insertion loss in a modulator configuration is the optical power loss within the modulator. As shown in the table, the effective capacitive load of the modulator configurations of FIGS. 4-5 is reduced by a factor of 2, which may lead to large bandwidth improvements, as described above. Additionally, the loaded differential transmission line impedances in the modulator configurations of FIGS. 4-5 increase by a factor of $\sqrt{2}$, which may result in power savings for drivers.

TABLE A

Summary of Modulator Configuration Characteristics Comparison

| | Differential Push-Pull (FIG. 1) | Differential Dual-Drive (FIG. 2) | Differential Series Push-Pull (FIGS. 4-5) |
|---|---|---|---|
| Equivalent Differential Mode Capacitance Load | C/2 | — | C/4 |
| Equivalent Common Mode Capacitance Load | C | C | C/4 |
| Differential Transmission Line Impedance, $Z_0 = (\sqrt{L/C})$ | $Z_0$ | $Z_0$ | $\sqrt{2}Z_0$ |
| Optical Insertion Loss (for a given phase shift and $V_{drive}$) | α | α | 2α |

Figure 7:
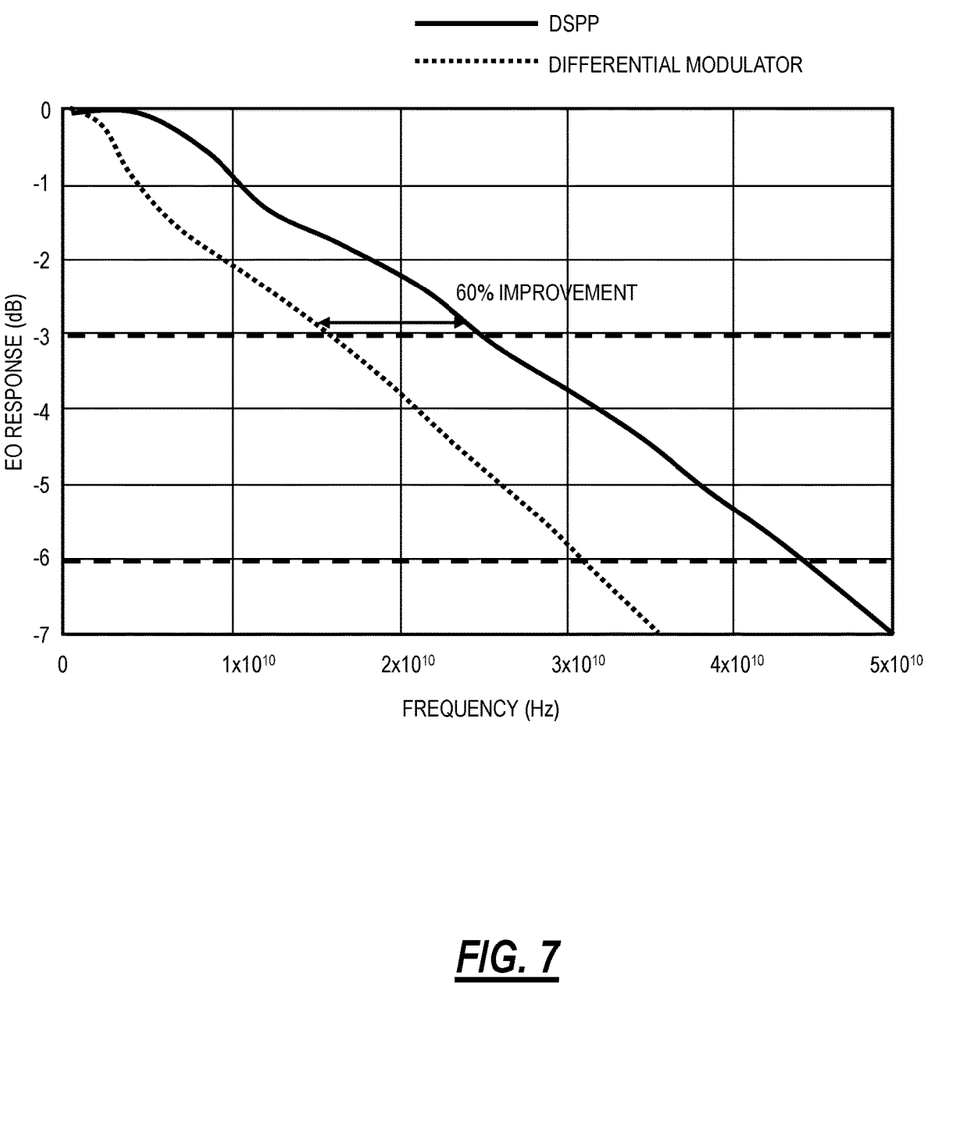
FIG. 7 is a graph of the simulation results comparing the electro-optical bandwidths of the modulators of FIGS. 1-2 with the modulators of FIGS. 4-5, in accordance with the present disclosure.

FIG. 7 illustrates the simulation results comparing the electro-optical operational bandwidths of the differential series push-pull modulator configurations of FIGS. 4-5 and the differentially driven modulators in FIGS. 1-2. The simulation was performed using STM diode model parasitics and differential transmission lines in the same process. In the STM process, the modulators may be transmission line loss limited, and the absolute bandwidth may improve in any process with higher substrate resistivity (e.g., IME). However, as shown in FIG. 7, the relative bandwidth improvement for the modulator configurations of FIGS. 4-5 is valid for other processes.

The implementation of differential series push-pull modulator architectures shown in FIGS. 4-5 have been found to result in several improvements and advantages in the design of traveling wave Mach-Zehnder modulators. As shown in FIG. 6 and described above, the diode arrangement of the sub-modulators 10A, 10B on either side of the central virtual ground 108 cause the capacitive loading (C) on each transmission line to be reduced by half (i.e., C/2). Moreover, this lowered capacitance results in improved bandwidth of operation in the differential traveling wave series push-pull Mach-Zehnder modulator. Further, the halved capacitance also means an increased characteristic impedance ($Z_0$) for loaded transmission lines, according to the lossless line approximation $Z_0=\sqrt{L/C}$, where L is the inductance of the transmission line and C is the capacitance, which may be replaced by C/2 resulting in $Z_0=\sqrt{2L/C}$ such that the characteristic impedance increases by a factor of $\sqrt{2}$. This higher loaded transmission line impedance may increase power savings in the driver by a factor of about 1.44 (i.e., $\sqrt{2}$). Finally, the differential traveling wave series push-pull Mach-Zehnder modulator configurations of FIGS. 4-5 may be arranged in a fully symmetrical layout, which causes the central virtual ground and may aid in or simplify the design and/or fabrication processes of the modulator and corresponding die.

By contrast, in both conventional differential modulator configurations of FIGS. 1-2, the transmission lines are loaded by a full parasitic capacitance of the phase shifter (diodes), which may lead to a reduced bandwidth (i.e., due to microwave losses), decreased loaded transmission line impedance, and accordingly higher power consumption (i.e., lower efficiency) in the drivers 12.

The modulator configurations of FIGS. 4-5 may be implemented as silicon photonic modulators in Coherent Optical Subassemblies (COSA), for example. Additionally, these type of modulator configurations have been investigated and widely simulated in Cadence™ and ADS™.

Physical implementations of a single segment or electrode connected to a silicon optical waveguide are discussed below. An electrode may be viewed as part of a p-n junction of a diode that is formed between the electrode and a virtual ground at the other side of the optical waveguide. For example, the electrode may be connected to the n-doped region while the virtual ground may be connected to the p-doped region of the p-n junction.

During forward biasing, electron-hole carriers may be injected into the silicon waveguide region creating a refractive index change, and thus, a phase change. Similarly, during reverse biasing, electron-hole carriers may be pulled away from the silicon waveguide region, creating a refractive index change, thereby creating another corresponding phase change.

The modulator fabrication process may include creating a silicon-on-insulator (SOI) wafer. Fabless processing may provide equivalent capacitance and/or resistance of the junction.

The wavelength of the laser light injected into the optical waveguide may range from about 1530 nm to about 1565 nm.

The differential series push-pull modulator configurations of FIGS. 4-5 may advantageously be used in the implementation of high bandwidth traveling wave Mach-Zehnder optical modulators in Silicon photonics processes. Advantageously, the differential series push-pull modulator configurations of FIGS. 4-5 enable reduced power consumption of the driver 102 due to the increased loaded impedance of the modulator.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical modulator comprising:
   a differential driver connected to at least two transmission line conductors each connected to a respective first electrode configured to receive an RF+ signal from the differential driver and second electrode configured to receive an RF− signal from the differential driver;
   an optical waveguide branching into top and bottom regions near an input port and recombining near an output port;
   a central node;
   a first sub-modulator encompassing the top region and connected to the first electrode, the first sub-modulator including a first node configured to receive a common mode voltage $V_{CM}$ via a first high impedance path;
   a second sub-modulator encompassing the bottom region and connected to the second electrode, the second sub-modulator including a second node configured to receive the $V_{CM}$ via a second high impedance path, the first sub-modulator and the second sub-modulator being symmetrically arranged about the central node resulting in a central virtual ground; and
   a plurality of diodes including a first diode between the first electrode and the first node such that an $V_{CM}+V_{RF}$ voltage drop occurs across the first diode, a second diode between the first node and the central node such that an $V_{CM}-V_{RF}$ voltage drop occurs across the second diode, a third diode between the second node and the central node such that an $V_{CM}+V_{RF}$ voltage drop occurs across the third diode, and a fourth diode between the second electrode and the second node such that an $V_{CM}+-V_{RF}$ voltage drop occurs across the fourth diode,
   wherein the plurality of diodes is configured such that the optical modulator operates as a fully differential series push-pull modulator.

2. The optical modulator of claim 1, wherein the first sub-modulator and the second sub-modulator each operate as a single-ended series push-pull modulator.

3. The optical modulator of claim 2, wherein the first sub-modulator and the second sub-modulator each operate as the single-ended series push-pull modulator, based on a voltage drop on each diode of the plurality of diodes in the first sub-modulator and the second sub-modulator.

4. The optical modulator of claim 1, wherein:
   the first sub-modulator comprises a first sub-branch of the top region of the optical waveguide that splits and recombines near each distal end of the first sub-modulator, and
   the second sub-modulator comprises a second sub-branch of the bottom region of the optical waveguide that splits and recombines near each distal end of the second sub-modulator.

5. A method comprising:
   providing an optical modulator including:
      a differential driver connected to at least two transmission line conductors each connected to a respective first electrode configured to receive an RF+ signal from the differential driver and second electrode configured to receive an RF− signal from the differential driver;
      an optical waveguide branching into top and bottom regions near an input port and recombining near an output port;
      a central node;
      a first sub-modulator encompassing the top region and connected to the first electrode the first sub-modulator including a first node configured to receive a common mode voltage $V_{CM}$ via a first high impedance path;
      a second sub-modulator encompassing the bottom region and connected to the second electrode, the second sub-modulator including a second node configured to receive the $V_{CM}$ via a second high impedance path, the first sub-modulator and the second sub-modulator being symmetrically arranged about the central node resulting in a central virtual ground; and
      a plurality of diodes including a first diode between the first electrode and the first node such that an $V_{CM}+V_{RF}$ voltage drop occurs across the first diode, a second diode between the first node and the central node such that an $V_{CM}-V_{RF}$ voltage drop occurs across the second diode, a third diode between the second node and the central node such that an $V_{CM}+V_{RF}$ voltage drop occurs across the third diode, and a fourth diode between the second electrode and the second node such that an $V_{CM}+-V_{RF}$ voltage drop occurs across the fourth diode,
      wherein the plurality of diodes is configured such that the optical modulator operates as a fully differential series push-pull modulator.

6. The method of claim 5, wherein the first sub-modulator and the second sub-modulator each operate as a single-ended series push-pull modulator.

7. The method of claim 6, wherein the first sub-modulator and the second sub-modulator each operate as the single-ended series push-pull modulator, based on a voltage drop on each diode of the plurality of diodes in the first sub-modulator and the second sub-modulator.

8. The method of claim 5, wherein:
   the first sub-modulator comprises a first sub-branch of the top region of the optical waveguide that splits and recombines near each distal end of the first sub-modulator, and
   the second sub-modulator comprises a second sub-branch of the bottom region of the optical waveguide that splits and recombines near each distal end of the second sub-modulator.

9. A method of operating an optical modulator comprising:
   producing an input signal via a differential driver connected to at least two transmission line conductors each connected to a respective first electrode receiving an RF+ signal from the differential driver and second electrode receiving an RF− signal from the differential driver;
   providing an optical signal to an optical waveguide branching the optical signal into top and bottom regions near an input port and recombining near an output port;
   modulating a first branch of the optical signal with a first sub-modulator encompassing the top region and connected to the first electrode; and
   modulating a second branch of the optical signal with a second sub-modulator encompassing the bottom region and connected to the second electrode;
   wherein the first sub-modulator and the second sub-modulator are symmetrically arranged about a central node resulting in a central virtual ground, and wherein the optical modulator comprises a plurality of diodes including a first diode between the first electrode and the first node such that an $V_{CM}+V_{RF}$ voltage drop occurs across the first diode, a second diode between the first node and the central node such that an $V_{CM}-V_{RF}$ voltage drop occurs across the second diode, a third diode between the second node and the central node such that an $V_{CM}+V_{RF}$ voltage drop occurs across the third diode, and a fourth diode between the second electrode and the second node such that an $V_{CM}+-V_{RF}$ voltage drop occurs across the fourth diode, such that the optical modulator operates as a fully differential series push-pull modulator.

10. The method of claim 9, wherein the first sub-modulator and the second sub-modulator each operate as the single-ended series push-pull modulator, based on a voltage drop on each diode in the first sub-modulator and the second sub-modulator.

11. The method of claim 9, wherein the first sub-modulator and the second sub-modulator are arranged in a substantially symmetrical layout about the central virtual ground.

12. The method of claim 9, wherein the first sub-modulator is driven by a $+V_{RF}$ signal from the differential driver and the second sub-modulator is driven by a $-V_{RF}$ signal from the differential driver.

* * * * *